3,644,318
PROCESS FOR THE POLYMERIZATION OF OLEFINS

Bernd Diedrich and Karl Diether Keil, Frankfurt am Main, Germany, assignors to Farbwerke Hoechst Aktiengesellschaft vormals Meister Lucius & Bruning, Frankfurt am Main, Germany
No Drawing. Filed June 25, 1969, Ser. No. 836,589
Claims priority, application Germany, Aug. 21, 1968,
P 17 95 197.2; June 6, 1969, P 19 28 772.0
Int. Cl. C08f 1/56, 3/02
U.S. Cl. 260—88.2                                              8 Claims

ABSTRACT OF THE DISCLOSURE

Process for homo- and copolymerizing olefins in the presence of a mixed catalyst comprising, as component A, a reaction product of magnesium alcoholates with tetravalent halogenated titanium compounds and, as component B, organo-aluminum compounds. Already under a pressure of less than 20 atmospheres the yields per catalyst obtained are so high that the remainders of catalyst need not be removed from the polymer. Optionally, products can also be prepared which have a very narrow molecular weight distribution and very good color and corrosion values.

---

The present invention provides a process for polymerizing olefins in the presence of a mixed catalyst.

It is known to polymerize α-olefins and mixtures thereof according to the low pressure process of Ziegler. In this process, the catalysts used are prepared from mixtures of compounds of elements of sub-groups IV to VI of the Periodic Table and organo-metal compounds of elements of Groups I to III of the Periodic Table, and the polymerization is generally carried out in suspension, in solution or even in the gaseous phase.

Furthermore, processes wherein the catalyst components are used in combination with a carrier material are known. For example, according to the process of French Pat. No. 1,198,422 the compounds of elements of sub-groups IV to VI of the Periodic Table are treated with carrier materials such as bentonite, pumice, kieselguhr, calcium phosphate or silica gel and subsequently reduced with organo-aluminum compounds. In this process, however, the polymerization proceeds independently of the type of carrier material; only the composition of the catalysts fixed on the carrier material is of importance. It is especially disadvantageous to have to remove the catalyst and the carrier material for a further processing of the polymers obtained.

Several other patents already point out that a determined composition and nature of the carrier material is required to achieve a sufficiently high activity. Thus, according to Belgian Pat. No. 609,261, alkaline earth metal phosphates are used which, however, prior to the reaction with titanium or vanadium compounds, have to be heated to temperatures of from 200 to 1,000° C. to ensure a sufficient activity for the polymerization. Nevertheless, only very poor polymerization yields are obtained. Belgian Pat. No. 650,679 and French Pat. No. 1,448,320 disclose hydroxychlorides of bivalent metals of the general formula Me(OH)Cl, preferably Mg(OH)Cl, as the carrier material for Ziegler catalysts. The intended chemical reaction of the carrier material with the transition metal component proceeds, for example, according to the following equation:

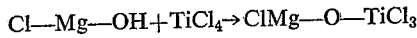

High polymerization yields are, however, only obtained under a pressure of about 20 atmospheres. Another drawback is the relatively complicated mode of preparation of the preferably used Mg(OH)Cl by very cautious stepwise dehydration of $MgCl_2 \cdot 6H_2O$ at 285° C. and, moreover, the relatively high chlorine content of the carrier material.

Furthermore, German Pat. No. 1,214,653 discloses a process for the preparation of supported catalysts, wherein pyrogenic metal or metalloid oxides, preferably pyrogenic alumina, pyrogenic titanium dioxide or pyrogenic silica, serving as carrier materials and the surfaces of which contain hydroxy groups, are reacted with determined heavy metal compounds of the metals of Groups, IVa, Va, VIa, VIIa and VIII of the Periodic Table. The medium particle size of the carrier material has to be inferior to about 0.1 micron and the concentration of hydroxy groups has to be such that the hydroxy groups react with at least $1 \times 10^{-4}$ equivalents of the transition metal per gram of carrier material.

However, even at a pressure of 190 atmospheres gage, the polymerization yields are so poor that it is absolutely necessary to remove the catalyst or the carrier material subsequently from the polymer in order to obtain a useful product.

In industry, the polymerization reactions according to the Ziegler process using supported catalysts are, however, easily carried out only if the polymers can be processed without having to remove the catalyst and carrier material. This is, however, only possible if high polymerization yields per catalyst unit are obtained; especially a high chlorine content in the polymer may cause decoloration of the product obtained or corrosion damage to the processing machines.

The present invention provides a process for homo- and copolymerizing olefins of the general formula $R-CH=CH_2$ in which R stands for hydrogen or a hydrocarbon radical, preferably a straight-chain or branched substituted or unsubstituted alkyl group having 1 to 10 carbon atoms, in solution, in suspension or in the gaseous phase, at temperatures of from 20 to 150° C., preferably from 50 to 100° C., under a pressure of up to 50 atmospheres, preferably from 1.5 to 8 atmospheres, in the presence of a mixed catalyst consisting of a reaction product of a titanium compound with a magnesium compound (component A) and of an organo-aluminum compound (component B), optionally with the control of the molecular weight by means of hydrogen, which process comprises carrying out the polymerization in the presence of a mixed catalyst, component A of which has been prepared by reacting magnesium alcoholates with tetravalent halogenated titanium compounds.

It is extremely surprising and not at all obvious that magnesium alcoholates can be reacted with halogenated tetravalent titanium compounds and that these reaction products constitute especially active supported catalysts; for Belgian Pat. No. 650,679 explicitly points out that, when bivalent metal compounds different from

are used as carrier material, no active catalysts can be obtained. In contradistinction thereto, considerably more active supported catalyst than those obtained with Mg(OH)Cl are prepared according to the process of the invention.

The process uses, as component A, a titanium-containing reaction product of magnesium alcoholates with a tetravalent halogenated titanium compound, unreacted magnesium alcoholate being likewise used for the polymerization. The reaction product is a special type of a supported catalyst since the reaction brings about a close union between the magnesium alcoholate and the halogenated tetravalent titanium compound and alters structure of the reaction components.

This constitutes a substantial difference from processes using supported catalysts in which the catalyst is either deposited on the carrier material or the carrier material is impregnated with the catalyst, since the chemical structure of those catalysts is not altered by the carrier material.

As transition metal compounds suitable for the preparation of component A, there are used tetravalent halogenated titanium compounds, preferably titanium compounds of the general formula $TiX_n(OR)_{4-n}$ in which $n$ is 1 to 4, X stands for chlorine or bromine, and R for identical or different hydrocarbon radicals, especially straight-chain or branched alkyl groups having 1 to 18, preferably 1 to 10, carbon atoms.

Examples thereof are $TiCl_4$, $Ti(OC_2H_5)_2Cl_2$, $Ti(OC_2H_5)_3Cl$, $Ti(OC_3H_7)_2Cl_2$, $Ti(OC_3H_7)_3Cl$, $Ti(OiC_3H_7)_2Cl_2$, $Ti(OiC_3H_7)_3Cl$, $Ti(OiC_4H_9)_2Cl_2$, $Ti(OiC_4H_9)_3Cl$ In some cases, it may be advantageous to prepare the halogeno-ortho-titanic acid esters of the above formula in situ by reacting the respective ortho-titanic acid ester with $TiCl_4$ in a corresponding proportion.

The reaction is advantageously carried out at temperatures of from 0 to 200° C., the upper temperature limit being determined by the decomposition temperature of the tetravalent halogenated titanium compound used, it is advantageously carried out at temperatures of from 60 to 120° C.

The reaction may be effected in inert diluents, for example aliphatic or cycloaliphatic hydrocarbons as are currently used for the low pressure process, such as butane, pentane, hexane, heptane, cyclohexane, methyl-cyclohexane as well as aromatic hydrocarbons, such as benzene or toluene; hydrogenated Diesel oil fractions which have been carefully freed from oxygen, sulfur compounds and moisture are also useful.

Subsequently, the reaction product of magnesium alcoholate and tetravalent halogenated titanium compound which is insoluble in hydrocarbons is freed from unreacted titanium compound by washing it several times with one of the above inert diluents in which the titanium-(IV)-compound used is readily soluble.

For preparing component A, magnesium alcoholates, preferably those of the general formula $Mg(OR)_2$ are used, in which R stands for identical or different hydrocarbon radicals, preferably straight-chain or branched alkyl groups having 1 to 10 carbon atoms; magnesium alcoholates having alkyl groups of from 1 to 4 carbon atoms are preferred. Examples thereof are $Mg(OCH_3)_2$, $Mg(OC_2H_5)_2$, $Mg(OC_3H_7)_2$, $Mg(iOC_3H_7)_2$, $Mg(OC_4H_9)_2$, $Mg(iOC_4H_9)_2$, $Mg(OCH_2-CH_2-C_6H_5)_2$.

The magnesium alcoholates can be prepared by known methods, for example by reacting magnesium with alcohols, especially monohydric aliphatic alcohols.

Magnesium alcoholates of the general formula X—Mg—OR in which X stands for halogen, $(SO_4)_{1/2}$ carboxylate, especially acetate or OH, and R has the above meaning, may also be used.

These compounds are, for example, obtained by reacting alcoholic solutions of the corresponding anhydrous acids with magnesium.

The titanium content of component A may be within the range of from 0.05 to 10 mg.-atom preferably from 1 to 10 mg.-atom, per gram of component A. It can be controlled by the reaction time, the reaction temperature and the concentration of the tetravalent halogenated titanium compound used.

The concentration of the titanium component fixed on the magnesium compound is advantageously in the range of from 0.005 to 1.5 mmols, preferably from 0.03 to 0.8 mmol, per liter of dispersing agent or reactor volume. Generally, even higher concentrations are possible.

Prior to the reaction with the titanium compound, the magnesium alcoholate may be reacted with other inert inorganic solid substances which do not inhibit the polymerization, for example halides, sulfates, carbonates, phosphates, such as fluorides and chlorides, for example $MgF_2$, $MgCl_2$, $AlCl_3$, $ZnCl_2$, $NiCl_2$; alkaline earth metal carbonates, for example $BaCO_3$, alkaline earth metal phosphates, for example $Ca_3(PO_4)_2$.

Especially advantages results are obtained, as disclosed in detail hereinafter, using, as inorganic solid substance that does not inhibit the polymerization, magnesium compounds containing hydroxy groups.

The molar ratio of magnesium alcoholate to the magnesium compound containing hydroxy groups may vary within wide limits. Of advantage is a mixture of magnesium alcoholate and magnesium compound containing hydroxy groups in an amount of from 0.1 to 1.5 mols per gram-atom of magnesium.

The magnesium compounds containing hydroxy groups used are, for example, magnesium sulfates, carbonates, carboxylates, silicates, phosphates, all containing hydroxy groups, preferably $Mg(OH)_2$.

The magnesium compounds containing hydroxy groups are prepared by known methods.

For preparing the mixture of magnesium compounds used according to the invention the magnesium alcoholate is ground with the magnesium compound containing hydroxy groups, for example in a ball mill, whereupon an intimately mixed solid material having a particle size distribution of from 1 to 150μ is obtained.

A mixture of a magnesium alcoholate and a magnesium compound containing hydroxy groups may, however, also be prepared by reacting magnesium alcoholates with water or aqueous acids, for example sulfuric acid, carboxylic acids, phosphoric acid, hydrochloric acid. The alcohols formed in the reaction can be eliminated by drying the reaction product.

The tetravalent titanium compound of component A is suitably converted during the polymerization into a compound having a lower valence and which is active for the polymerization by means of the organo-aluminum compound (component B) at temperatures of from 20 to 150° C., preferably from 50 to 100° C.

It is, however, also possible to treat component A with the organo-aluminum compound at temperatures of from −30 to 100° C., preferably from 0 to 20° C., prior to the polymerization and then to use it for the polymerization. When chlorinated organo-aluminum compounds are used, it is however, suitable to wash the reaction product obtained and then to activate it by means of further organo-aluminum compound at temperatures of from 20 to 150° C., preferably from 50 to 100° C.

The organo-aluminum compounds used may be reaction products of aluminum-trialkyls or aluminum-dialkyl hydrides with hydrocarbon radicals having 1 to 16 carbon atoms, preferably $Al(iBu)_3$ or $Al(iBu)_2H$ and diolefins containing 4 to 20 carbon atoms, preferably isoprene; for example aluminum isoprenyl.

Furthermore suitable as component B are chlorinated organo-aluminum compounds, for example dialkyl-aluminum monochlorides of the formula $R_2AlCl$ or alkyl-aluminum sesquichlorides of the formula $R_3Al_2Cl_3$, in which formulae R stands for identical or different hydrocarbon radicals, preferably alkyl groups having 1 to 16 carbon atoms, preferably 2 to 12 carbon atoms, for example $(C_2H_5)_2AlCl$, $(iC_4H_9)_2AlCl$, $(C_2H_5)_3Al_2Cl_3$.

It is advantageous to use, as component B, aluminum-trialkyls of the formula $AlR_3$ or aluminum-dialkyl hydrides of the formula $AlR_2H$, in which formulae R stands for identical or different hydrocarbons, preferably alkyl groups having 1 to 16, preferably 2 to 6, carbon atoms, for example $Al(C_2H_5)_3$, $Al(C_2H_5)_2H$, $(Al(C_3H_7)_3$, $Al(C_3H_7)_2H$, $(AliC_4H_9)_3$ or $Al(iC_4H_9)_2H$.

The organo-aluminum component may be used in a concentration of from 0.5 to 10 mmols, preferably from 2 to 4 mmols, per liter of dispersing agent or per liter of reactor volume.

The polymerization is carried out in solution, in suspension or in the gaseous phase, in continuous or discontinuous manner, at temperatures of from 20 to 150° C., preferably from 50 to 100° C. The pressures are up to 50 atmospheres, preferably from 1.5 to 8 atmospheres. Generally, even higher or lower pressures and temperatures are also possible.

Suitable for the suspension polymerization are inert solvents currently used for the low-pressure process of Ziegler and specified in detail further above for the preparation of component A.

As monomers there may be used olefins of the general formula $R-CH=CH_2$ in which R stands for hydrogen or a hydrocarbon radical especially a straight-chain or branched substituted or unsubstituted alkyl group having 1 to 10, preferably 1 to 8 carbon atoms, for example ethylene, propylene, butene-(1), pentene-(1), 4-methyl-pentene-(1) or octene-(1).

Mixtures of olefins of the above formula may also be used, especially those containing up to 10% by weight, preferably up to 5% by weight, of one or more co-monomers.

Ethylene or mixtures of ethylene with up to 10% by weight, preferably up to 5% by weight, of α-olefins of the cited formula are preferably polymerized.

The molecular weights of the polymers can be controlled in known manner, preferably by means of hydrogen.

The great technical advantage of the process of the present invention over that disclosed in Belgian Pat. No. 650,679 and in French Pat. No. 1,448,320 resides in the fact that the polymerization can be carried out in a simpler manner since the supported catalysts of the invention permit high yields per catalyst already at a pressure of from 4 to 9 atmospheres, which is usual for the Ziegler polymerization, so that the supported catalyst can be left entirely in the polymer.

In the case of suspension polymerization, expensive operations such as decomposition of the catalyst or removal of the catalyst and carrier material, are, thus, no longer necessary. After filtration to separate the dispersing agent, the product obtained is dried and directly processed. The extremely small amounts of catalyst and carrier material do neither cause decloration of the polymers nor corrosion damage to the processing machines.

According to the processes of the two above-cited patents, however, substantially poorer yields per catalyst are obtained per gram of MgOHCl on which $TiCl_4$ is fixed, even at a pressure of 20 atmospheres.

Thus, for example, according to French Pat. No. 1,448,320 1 gram of MgOHCl on which $TiCl_4$ is fixed yields at most 1.5 kg. of polymer at 20 atmospheres, whereas the polymerization of ethylene according to the process of the invention, provides 4 to 20 kg. of polymer at pressures of from 3 to 8 atmospheres, for example in the presence of a reaction product of 1 gram of $Mg(OC_2H_5)_2$ with $TiCl_2(OiC_3H_7)_2$.

Moreover, all contrast to MgOH·Cl, magnesium alcoholates do not contain chlorine; therefore the polymers obtained with the use of the supported catalyst of the invention exhibit substantially better corrosion values with the same content of carrier material.

When catalysts are used, components A of which have been prepared by reacting chloroalkoxy-titanates-(IV) of the formula $TiCl_n(OR)_{4-n}$ in which $n$ is a number of 1.5 to 2.5 and R stands for identical or different alkyl groups having 2 to 8 carbon atoms, with a mixture of magnesium alcoholate and magnesium compounds containing hydroxy groups in an amount of from 0.1 to 1.5 mols per gram-atom of magnesium, the M$w$/M$n$-values of the polymers can be controlled within a range of from 4 to 8 by means of the content of hydroxy groups in the mixture of the magnesium compounds.

In this manner, the properties that depend on the molecular weight distribution, for example flow properties of the polymer melt, impact resistance, dimensional stability, resistance to crack growth, permanent stress resistance, drop resistance, surface brilliance, can simultaneously be combined to meet the highest technological requirements.

For example, when a mixture of magnesium alcoholate and magnesium hydroxide having a content of 0.2 mol of hydroxy groups per gram-atom of magnesium is used for the preparation of the catalyst, the polymerization of ethylene yields polymers having a M$w$/M$n$ value of 4.2.

The use of the above mixture having a content of hydroxy groups of 1 mol per gram-atom of magnesium provides catalysts that yield polymers having M$w$/M$n$-values of 5.6.

Finally, a mixture of magnesium compounds having a content of hydroxy groups of 1.3 mols per gram-atom of magnesium permits to obtain polymers having M$w$/M$n$ values of 8.2.

Another advantage of the process of this invention is the preparation of polymers having a very narrow molecular weight distribution (M$w$/M$n$-values of from 2 to 4) and interesting technological properties, with the use of chloroalkoxy-titanates-(IV) of the formula $TiCl_n(OR)_{4-n}$ in which $n$ is 1 to 2 and R stands for identical or different alkyl groups having 2 to 8 carbon atoms.

The products obtained in this manner have excellent color and corrosion values and are especially suitable for the production of injection-molded articles.

The following examples serve to illustrate the invention, but they are not intended to limit it thereto.

EXAMPLE 1

(I) Preparation of supported catalyst 11 g. of $Mg(OH_2H_5)_2$ were suspended in 50 ml. of Diesel oil (boiling range of from 130 to 160° C.) and 200 ml. of a 1-molar solution of $TiCl_2(OiC_3H_7)_2$ in cyclohexane were added. The suspension was refluxed for 7 hours. Subsequently, the precipitate was washed, by decanting and stirring, 6 times each with 150 ml. of cyclohexane. Care had to be taken that the cyclohexane overlying the solid substance was free from titanium compound. The volume of the suspension was completed to 250 ml.

The titanium content of the suspension was determined colorimetrically by means of hydrogen peroxide (cf. G.O. Müller, Praktikum der quantitativen chemischen Analyse, 4th edition [1957], page 243). 10 ml. of the suspension contained 2.9 mmols of titanium compound.

(II) Polymerization of ethylene

In a vessel having a capacity of 150 ml., 100 ml. of Diesel oil having a boiling range of from 140 to 200° C. were heated to about 85° C. and the air was evacuated by flushing with pure nitrogen. Subsequently, a solution of 54 g. (400 mmols) of aluminum-triethyl in 500 ml. of Diesel oil and 70 ml. of a suspension of the supported catalyst prepared according to (I) were added. The polymerization was carried out at 85° C. 6 kg. of ethylene per hour and such an amount of hydrogen were fed in that the hydrogen content in the gaseous phase amounted to 20% by volume. The pressure rose to about 7 atmospheres during the polymerization. After 7 hours the polyethylene formed was separated by filtration from the dispersing agent and dried. 41 kg. of polyethylene having a reduced specific viscosity of 2.1 (measured on a 0.1%-solution in decahydronaphthalene at 135° C.) were obtained, i.e. 11.7 kg. of polyethylene per gram of $Mg(OC_2H_5)_2$ used for the preparation of the catalyst.

The polyethylene obtained had a very narrow molecular weight distribution (M$w$/M$n$=2.9). The M$w$/M$n$-values were determined with the help of the fractionation data obtained by means of the gel permeation chromatograph of Messrs. Water (USA) in 1,2,3-trichlorobenzene as solvent and eluent at 130° C.

The polymer exhibited excellent color and corrosion values.

EXAMPLE 2

Copolymerization of ethylene and butene-(1)

In a 150 l.-vessel, 100 l. of Diesel oil having a boiling range of from 140 to 200° C. were heated to 85° C. and the air was evacuated by flushing with pure nitrogen. Subsequently, a solution of 79.2 g. (400 mmols) of aluminum-triisobutyl in 500 ml. of Diesel oil and 70 ml. of a suspension of the supported catalyst (prepared according to 1 (I)) were added. The polymerization was carried out at 85° C. 6 kg. of ethylene and 180 g. of butene-(1) per hour and such an amount of hydrogen were fed in that the hydrogen content in the gaseous phase amounted to 20% by volume. The pressure rose to about 7 atmospheres in the course of the polymerization. After 7 hours the copolymer of ethylene/butene was separated by filtration from the dispersing agent and dried. About 43 kg. of an ethylene-butene copolymer having a reduced specific viscosity of 2.5 (measured on a 0.1%-solution in decahydronaphthalene at 135° C.) and a density of 0.932 g./cc. were obtained. The product exhibited excellent color and corrosion values.

EXAMPLE 3

(I) Preparation of supported catalyst 55 g. of $Mg(OC_2H_5)_2$ were suspended in 1,000 ml. of Diesel oil (boiling range of from 130 to 160° C.).

At 55° C., 95 g. (500 mmols) of $TiCl_4$ and 142 g. (500 mmols) of $Ti(OiC_3H_7)_4$ were added dropwise at the same time within 1 hour while stirring. Subsequently, the suspension was stirred for 7 hours at 85° C. The precipitate was washed, by decanting and stirring, 6 times with 500 ml. of cyclohexane. Care was taken that the hydrocarbon overlying the solid substance was free from titanium compound. The volume of the suspension was completed to 1,200 ml.

The titanium content of the suspension was determined colorimetrically by means of hydrogen peroxide.

10 ml. of suspension contained 3.2 mmols of titanium compound.

(II) Polymerization of ethylene

In a 150 l.-vessel 100 l. of Diesel oil having a boiling range of from 140 to 200° C. were heated to 85° C. and the air was evacuated by flushing with pure nitrogen. Subsequently, a solution of 68.8 g. (=800 mmols) of diethyl-aluminum hydride in 500 ml. of Diesel oil and 60 ml. of a suspension of the supported catalyst (as prepared according to 3 (I)) were added. The polymerization was carried out at 85° C. 5 kg. of ethylene per hour and such an amount of hydrogen were fed in that the hydrogen content in the gaseous phase amounted to 25% by volume. The pressure rose to about 8 atmospheres during the polymerization. After 7 hours the polyethylene formed was separated by filtration from the dispersing agent and dried. About 35 kg. of polyethylene having a reduced specific viscosity of 2.4 (measured on a 0.1%-solution in decahydronaphthalene at 135° C.) were obtained. The product exhibited excellent color and corrosion values.

EXAMPLE 4

(I) Preparation of supported catalyst (a) 8.6 g. of $Mg(OCH_3)_2$ were suspended in 50 ml. of Diesel oil (boiling range of from 130 to 160° C.) and 200 ml. of a 1-molar solution of $TiCl_2(OiC_3H_7)_2$ in cyclohexane were added. The suspension was refluxed for 10 hours and then the precipitate was washed, by decanting and stirring, 7 times with 150 ml. of cyclohexane. Care was taken that the cyclohexane overlying the solid substance was free from titanium compound.

The volume of the suspension was completed to 250 ml. Its titanium content was determined colorimetrically by means of hydrogen peroxide.

10 ml. of suspension contained 3.2 mmols of titanium compound.

(b) Treatment of the suspension of supported catalyst with ethyl-aluminum sesquichloride: A solution of 50 mmols of $Al_2(C_2H_5)_3Cl_3$ in 100 ml. of Diesel oil was added, within 1 hour at 0° C., to 100 ml. of a suspension of supported catalyst (prepared according to I (a)). Stirring was continued for 5 hours at 0° C. and for 2 hours at 20° C. Subsequently, the blue-black precipitate was washed 4 times with 150 ml. of Diesel oil. The volume of the suspension was completed to 100 ml.

(II) Homopolymerization of ethylene 1,000 ml. of Diesel oil having a boiling range of from 130 to 150° C. were introduced into a glass autoclave having a capacity of 2 liters, and the air was evacuated by flushing with pure nitrogen. Subsequently, a solution of 0.35 g. (4 mmols) of diethylaluminum hydride in 10 ml. of Diesel oil and 0.2 ml. of the suspension of supported catalyst (as prepared according to I(b)) were added.

At 85° C. 50 g. of ethylene per hour were fed in. After 8 hours the polymerization was discontinued. The polyethylene obtained was separated by filtration from the dispersing agent and dried. 390 g. of polyethylene were obtained.

EXAMPLE 5

(I) Preparation of supported catalyst 11 g. of $Mg(OC_2H_5)_2$ were suspended in 50 ml. of Diesel oil (boiling range of from 130 to 160° C.) and 200 ml. of a 1-molar solution of $TiCl_4$ in Diesel oil were added. The suspension was refluxed for 15 hours.

Subsequently, the precipitate was washed, by decanting and stirring, 6 times with 150 ml. of Diesel oil. The Diesel oil overlying the solid material should be free from titanium compound. The volume of the suspension was completed to 250 ml. Its titanium content was determined colorimetrically by means of hydrogen peroxide.

10 ml. of suspension contained 2.1 mmols of titanium compound.

(II) Homopolymerization of polyethylene 1,000 ml. of Diesel oil having a boiling range of from 130 to 150° C. were introduced into a glass autoclave having a capacity of 2 liters, and the air was evacuated by flushing with pure nitrogen.

Subsequently, a solution of 0.5 g. of aluminum-triethyl in 20 ml. of Diesel oil and 0.2 ml. of the suspension of supported catalyst (as prepared according to 5(I)) were added. At 85/ C. 30 g. of ethylene per hour were fed in. After 9 hours the polymerization was discontinued. The polyethylene obtained was separated by filtration from the dispersing agent and dried. 260 g. of polyethylene were obtained.

EXAMPLE 6

Polymerization of ethylene in the gaseous phase 500 g. of polyethylene (reduced specific viscosity of 1.5, apparent density 450 g./l.) were introduced into a horizontal 10 l.-reactor provided with a stirrer, the stirring means of which scrape along the inner wall of the reactor. The reactor was freed from air by evacuating it several times and flushing it for several hours with a mixture of ethylene and hydrogen. Subsequently, the contents of the reactor were heated to 83° C. 5.7 g. of $Al(C_2H_5)_3$ (50 mols) and 17 ml. of suspension of the supported catalyst (prepared according to Example 1 (I)) were fed in.

400 g. of ethylene per hour and such an amount of hydrogen were fed in that the hydrogen portion always was 30% by volume during the polymerization. The pressure rose to about 9 atmospheres during the reaction. After 12 hours the polymerization was discontinued. About 5.2 kg. of polyethylene having a reduced specific viscosity of 1.8 (measured on a 0.1%-solution in decahydronaphthalene at 135° C.) were obtained.

EXAMPLE 7

(I) Preparation of catalyst

To prepare a mixture of magnesium-ethylate and magnesium hydroxide having a content of hydroxy groups of 0.2 mol per gram-atom of magnesium, 114.3 g. (1 mol) of magnesium-ethylate were combined with 3.6 ml. (0.2 mol) of water and the mixture was then finely ground under exclusion of air and moisture.

100 g. of the magnesium compounds were suspended in 1,500 ml. of cyclohexane. After addition of 256 g. (0.9 mol) of titanium-tetra isopropylate, the suspension was heated to 50° C. while stirring under an atmosphere of nitrogen. At this temperature 208.6 g. (1.1 mols) of $TiCl_4$ were added dropwise within 2 hours. Under an atmosphere of nitrogen, the suspension was then stirred for another 8 hours at 70° C. The precipitate was subsequently washed, by decanting and stirring, at 60° C. 6 times each with 1,000 ml. of cyclohexane.

The volume of the suspensoin was completed to 1,500 ml. Its titanium content was determined colorimetrically by means of hydrogen peroxide.

10 ml. of suspension contained 2.1 mmols of titanium compounds.

(II) Polymerization of ethylene

Into a Pfaudler-vessel having a capacity of 200 liters, 100 l. of a hydrogenated Diesel oil fraction (boiling range of from 130 to 150° C.) were introduced and, while stirring, flushed with nitrogen; at 80° C. the Diesel oil was saturated with ethylene. Subsequently, hydrogen was fed in until the pressure of the vessel amounted to 2 atmospheres. After releasing the pressure, 81 g. (600 mmols) of $Al(C_2H_5)_3$ and 120 ml. of the suspension of catalyst (prepared according to 7 (I)) were added. At 85° C. 5 kg. of ethylene per hour and such an amount of hydrogen were fed in that the hydrogen content in the gaseous phase amounted to 30% by volume. The pressure rose to about 9 atmospheres during the polymerization. After 8 hours the polyethylene formed was separated by filtration from the dispersing agent by means of a pressure filter and dried. 38 kg. of polyethylene having a reduced specific viscosity of 2.0 (measured on a 0.1%-solution in decahydronaphthalene at 135° C.) and a density of 0.962 g./cc. were obtained.

The polymer had a $Mw/Mn$-value of 4.2 and exhibited excellent color and corrosion values.

The same advantageous results were obtained using titanium-tetraisobutylate instead of titanium-tetraisopropylate.

EXAMPLE 8

(I) Preparation of catalyst

To prepare a mixture of magnesium-ethylene and magnesium hydroxide having a content of hydroxy groups of 1 mol per gram-atom of magnesium, 57 g. (0.5 mol) of magnesium ethylate and 29.2 g. (0.5 mol) of magnesium hydroxide were ground in a ball mill under exclusion of air and moisture.

45 g. of the ground magnesium compounds were suspended in 750 ml. of cyclohexane. After addition of 128 g. (0.45 mol) of titanium-tetraisopropylate, the suspension was heated to 50° C. while stirring under an atmosphere of nitrogen. At this temperature, 104.3 g. (0.55 mol) of $TiCl_4$ were added dropwise within 2 hours. Subsequently, the suspension was stirred for 8 hours at 70° C. under an atmosphere of nitrogen. The precipitate was then washed, by decanting and stirring, at 60° C. 6 times each with 500 ml. of cyclohexane.

The volume of the suspension was completed to 750 ml. Its titanium content was determined colorimetrically by means of hydrogen peroxide.

10 ml. of suspension contained 2.4 mmols of titanium compound.

(II) Polymerization of ethylene

Under the conditions indicated under 7 (II), polymerization of ethylene was carried out in the presence of 120 ml. of the catalyst suspension (prepared according to 8 (I). 38 kg. of polyethylene having a reduced specific viscosity of 2.2 (measured on a 0.1%-solution in decahydronaphthalene at 135° C.) an d a density of 0.962 g./cc. were obtained.

The polymer had a $Mm/Mn$-value of 5.6 and exhibited excellent color and corrosion values.

EXAMPLE 9

(I) Preparation of catalyst

To prepare a mixture of magnesium-ethylate and magnesium hydroxide having a content of hydroxy groups of 1.4 mols per gram-atom of magnesium, 34.2 g. (0.3 mol) of magnesium ethylate and 40.8 g. (0.7 mol) of magnesium hydroxide were ground in a ball mill under the exclusion of air and moisture.

35 g. of the ground magnesium compounds were suspended in 750 ml. of a suspension. After addition of 128 g. (0.45 mol) of tetraisopropylate, the suspension was heated to 50° C. while stirring under an atmospheric of nitrogen. At this temperature 104.3 g. (0.55 mol) of $TiCl_4$ were added dropwise within 2 hours. Under an atmosphere of nitrogen, the suspension was then stirred for 8 hours at 70° C. The precipitate was then washed by decanting and stirring, at 60° C. 6 times each with 500 ml. of cyclohexane.

The volume of the suspension was completed to 750 ml. Its titanium content was determined colorimetrically by means of hydrogen peroxide.

10 ml. of suspension contained 2.8 mmols of titanium compound.

(II) Polymerization of ethylene

Under the conditions indicated sub 7 (II), polymerization of ethylene was carried out in the presence of 120 ml. of the catalyst suspension (prepared according to 9 (I)). 39 kg. of polyethylene having a reduced specific viscosity of 2.4 (measured on a 0.1%-solution in decarhydronaphthalene at 135° C.) and a density of 0.963 g./cc. were obtained. The polymer had a $Mw/Mn$-value of 8.2 and exhibited excellent color and corrosion values.

We claim:

1. In the process of homo- or copolymerizing olefins of the formula $R-CH=CH_2$ in which R is hydrogen or a hydrocarbon radical having 1 to 10 carbon atoms, in solution, in suspension or in the gaseous phase, at temperatures of from 20 to 150° C., under a pressure of up to 50 atmospheres, in the presence of a mixed catalyst comprising a reaction product of a titanium compound with a magnesium compound (component A) and of an organo-aluminum compound (component B) the improvement which comprises using as component A of the mixed catalyst the reaction product of a magnesium alcoholate having the formula $Mg(OR)_2$ wherein R stands for identical or different straight-chain or branched alkyl groups having 1 to 10 carbon atoms, with a titanium compound of the formula $TiX_n(OR)_{4-n}$ wherein $n$ is 1 to 4, X stands for chlorine or bromine and R stands for identical or different hydrocarbon radicals having 1 to 18 carbon atoms, said reaction being carried out in the presence of an aliphatic, cycloaliphatic or aromatic diluent.

2. A process as claimed in claim 1 wherein the titanium compound is titanium tetrachloride or chloroalkoxy-titanates of the formula $TiCl_n(OR)_{4-n}$ in which $n$ is 1 to 3 and R stands for identical or different straight-chain or branched alkyl groups having 1 to 10 carbon atoms.

3. A process as claimed in claim 1 wherein the titanium content per gram of component A is from 0.05 to 10 mols.

4. A process as claimed in claim 1 wherein component A is prepared by reacting the magnesium alcoholate with the titanium compound at temperatures of from 0 to 200° C.

5. A process as claimed in claim 1 wherein the organoaluminum compound is an aluminum-trialkyl of the formula $Al(R)_3$ or an aluminum-dialkyl hydride of the formula $Al(R)_2H$ where R stands for identical or different hydrocarbon radicals having 1 to 16 carbon atoms.

6. A process as claimed in claim 1 wherein the olefins polymerized are ethylene, propylene, butene-(1), pentene-(1) or 4-methyl-pentene-(1).

7. A process as claimed in claim 1 wherein mixtures of ethylene with up to 10% by weight of α-olefins of the formula $R-CH=CH_2$ in which R is a hydrocarbon radical having 1 to 10 carbon atoms are polymerized.

8. A process as claimed in claim 1 wherein the molecular weight of the resulting polymer is controlled by means of hydrogen.

References Cited

UNITED STATES PATENTS 3,400,110  9/1968  Dassesse et al. _____ 260—94.9

FOREIGN PATENTS 6,714,024  4/1968  Netherlands.
1,560,467  2/1969  France.

JOSEPH L. SCHOFER, Primary Examiner

E. J. SMITH, Assistant Examiner

U.S. Cl. X.R.

252—429 C, 431; 260—93.7, 94.9 E